US 8,418,688 B2

(12) United States Patent
King et al.

(10) Patent No.: US 8,418,688 B2
(45) Date of Patent: Apr. 16, 2013

(54) ASSEMBLY AND METHOD FOR MOUNTING SOLAR PANELS TO STRUCTURAL SURFACES

(75) Inventors: Zachary Adam King, Townsend, MA (US); Miles Clayton Russell, Westford, MA (US); Ruel Davenport Little, Concord, MA (US)

(73) Assignee: Greenray Inc., Littleton, MA (US)

( * ) Notice: Subject to any disclaimer, the term of this patent is extended or adjusted under 35 U.S.C. 154(b) by 598 days.

(21) Appl. No.: 12/592,751

(22) Filed: Dec. 2, 2009

(65) Prior Publication Data
US 2010/0154784 A1 Jun. 24, 2010

Related U.S. Application Data

(63) Continuation-in-part of application No. PCT/US2008/001678, filed on Feb. 8, 2008.

(60) Provisional application No. 61/200,708, filed on Dec. 3, 2008.

(51) Int. Cl.
*F24J 2/46* (2006.01)

(52) U.S. Cl.
USPC ........... 126/623; 126/621; 126/622; 126/660; 126/663; 126/707; 29/428; 52/173.3

(58) Field of Classification Search .................. 126/623, 126/622, 660, 621, 663, 666, 707, 664, 586, 126/710, 704; 29/428; 136/251, 244; 52/173.3
See application file for complete search history.

(56) References Cited

U.S. PATENT DOCUMENTS

| | | | |
|---|---|---|---|
| 4,111,188 A | 9/1978 | Murphy, Jr. | |
| 4,341,200 A * | 7/1982 | Bowen | 126/704 |
| 4,361,134 A * | 11/1982 | Bowen | 126/705 |
| 4,499,658 A | 2/1985 | Lewis | |
| 5,252,141 A | 10/1993 | Inoue et al. | |
| 5,460,660 A | 10/1995 | Albright et al. | |
| 5,593,532 A | 1/1997 | Falk et al. | |
| 5,733,382 A | 3/1998 | Hanoka | |
| 5,951,785 A | 9/1999 | Uchihashi et al. | |
| 6,046,399 A | 4/2000 | Kapner | |
| 6,105,317 A | 8/2000 | Tomiuchi et al. | |
| 6,354,289 B1 * | 3/2002 | Ridett | 126/622 |
| 6,370,828 B1 * | 4/2002 | Genschorek | 52/200 |
| 6,420,645 B1 * | 7/2002 | Ohtsuka et al. | 136/251 |
| 6,465,724 B1 | 10/2002 | Garvison et al. | |
| 6,528,718 B2 | 3/2003 | Yoda et al. | |
| 6,593,521 B2 | 7/2003 | Kobayashi | |
| 6,703,555 B2 | 3/2004 | Takabayashi et al. | |
| 6,750,391 B2 | 6/2004 | Bower et al. | |
| 6,959,517 B2 | 11/2005 | Poddany et al. | |
| 7,260,918 B2 * | 8/2007 | Liebendorfer | 52/173.3 |

(Continued)

OTHER PUBLICATIONS

SunSine® AC Module Crystal Clean™ Electricity for the Next Generation, Applied Power Corporation, 2000.

*Primary Examiner* — Avinash Savani
(74) *Attorney, Agent, or Firm* — Armstrong Teasdale LLP

(57) ABSTRACT

An assembly for mounting solar panels to structural surfaces includes a frame member adapted to receive and retain a first end portion of a solar panel, and a mounting foot adapted for attachment to the structural surface, wherein the frame member and the mounting foot are adapted for interlocking engagement with each other to mount an end of a solar panel on the structural surface.

13 Claims, 9 Drawing Sheets

U.S. PATENT DOCUMENTS

| | | |
|---|---|---|
| 7,592,537 B1 | 9/2009 | West |
| 2005/0115176 A1 | 6/2005 | Russell |
| 2006/0053706 A1 | 3/2006 | Russell |
| 2006/0219291 A1 | 10/2006 | Hikosaka et al. |
| 2007/0102036 A1 | 5/2007 | Cinnamon |
| 2008/0011289 A1* | 1/2008 | Sichanugrist et al. ........ 126/634 |

* cited by examiner

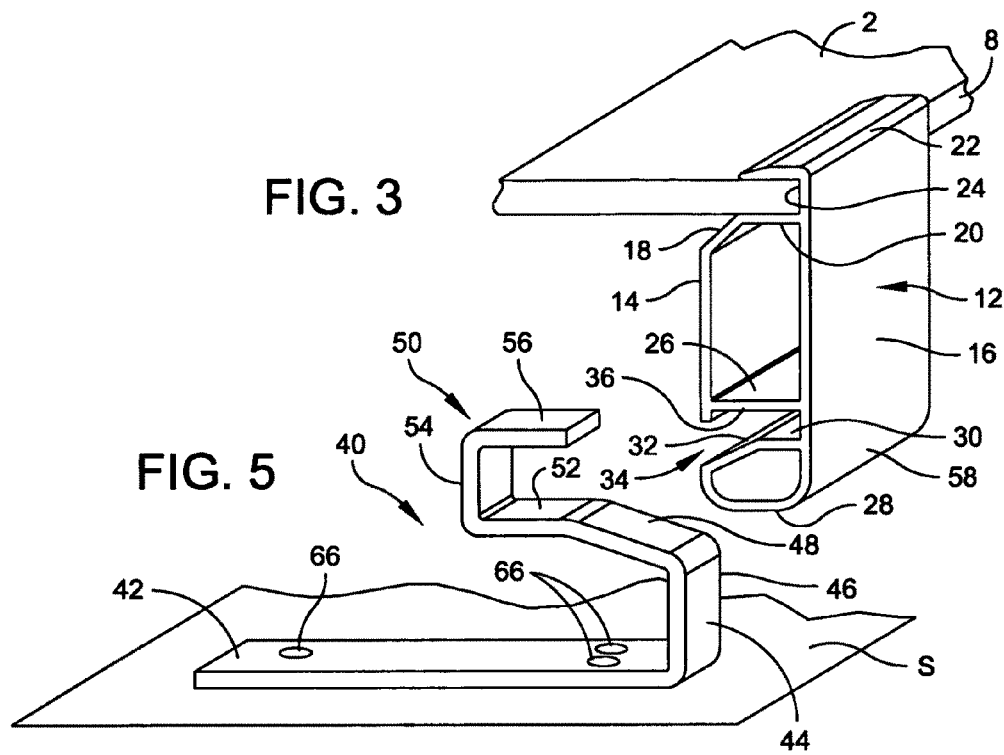
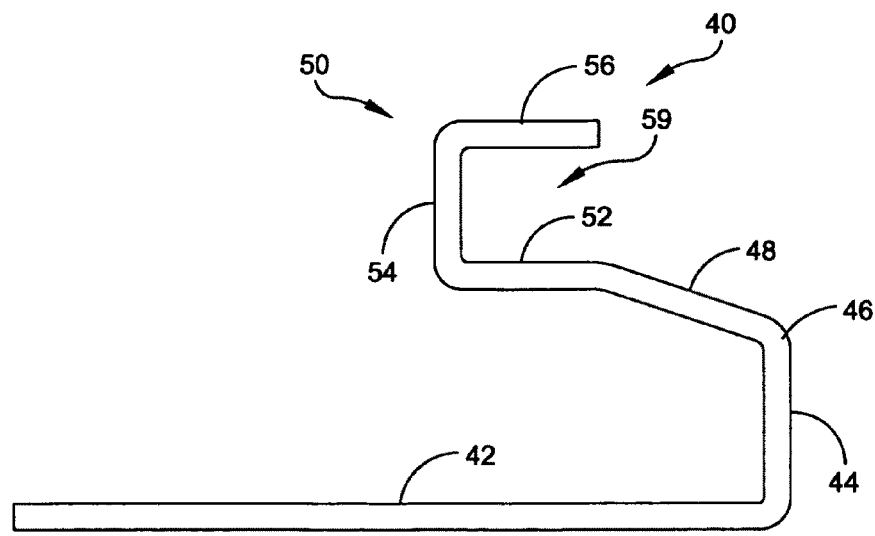

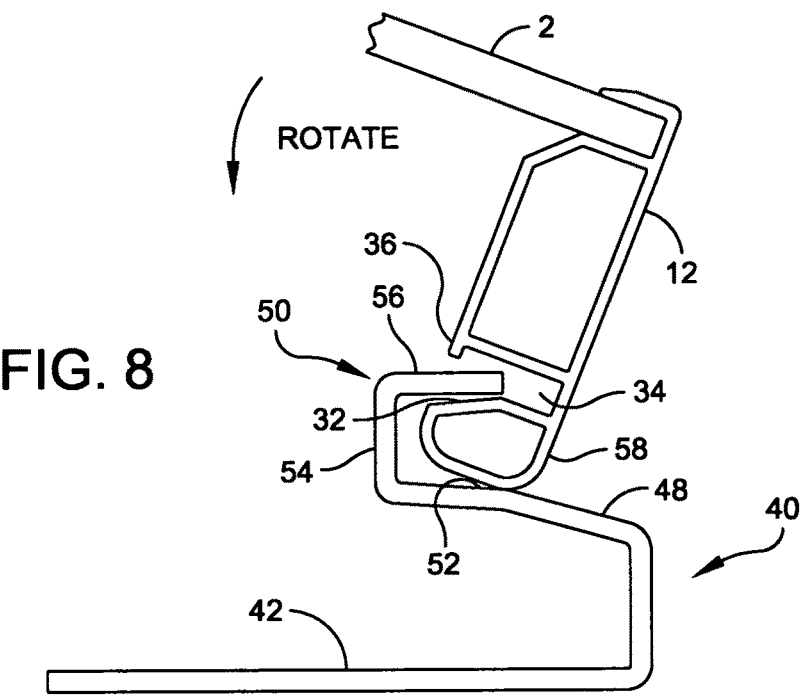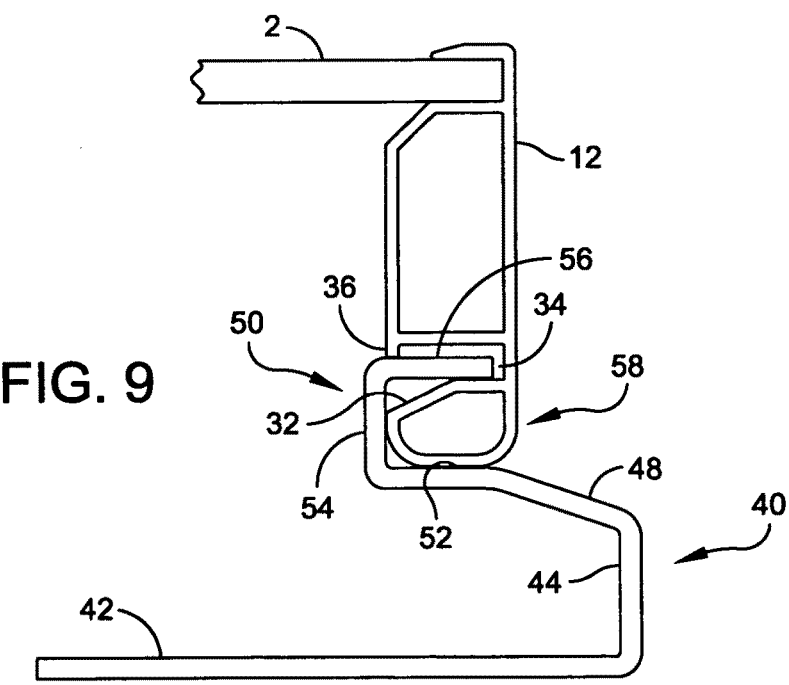

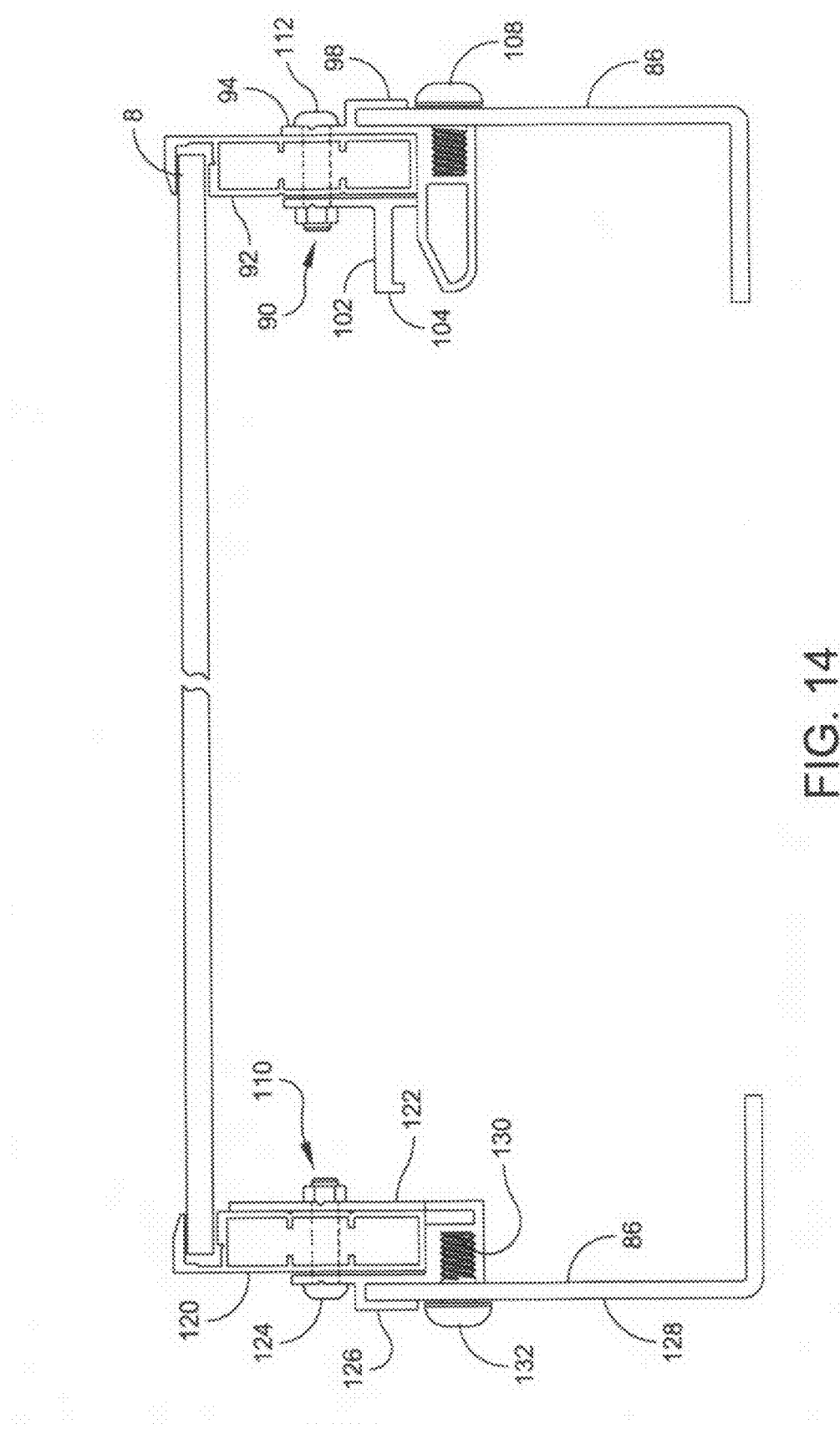

ASSEMBLY AND METHOD FOR MOUNTING SOLAR PANELS TO STRUCTURAL SURFACES

CROSS-REFERENCE TO RELATED APPLICATIONS

This patent application is a continuation-in-part of International Application PCT/US08/01678, filed Feb. 8, 2008, in the names of Zachary Adam King, Miles Clayton Russell and Ruel Davenport Little; and claims the benefit of U.S. Provisional Patent Application 61/200,708, filed Dec. 3, 2008, in the names of Zachary Adam King, Ruel Davenport Little and Miles Clayton Russell, the aforesaid applications being incorporated herein by reference.

BACKGROUND OF THE INVENTION

1. Field of the Invention

The invention relates generally to the installation of photovoltaic power generating systems, and more particularly to assemblies and methods for attaching photovoltaic modules, i.e., solar panels, to structures simply and quickly with minimal tools and parts, and requiring minimal manpower, thereby facilitating reduced costs and greater safety in installation.

2. Description of the Prior Art

The installation of solar panels on structures, particularly roofs, typically requires an assortment of components provided by multiple manufacturers. Because of different sizes and shapes of solar panels, as well as structures to which the panels are attached, there usually is required significant design time.

Further, the installation process presently requires a plurality of workers on the structure.

Still further, stacking of solar panels is not practicable on many surfaces, such as slanted roof tops.

Accordingly, there is a need for a mounting assembly and method for attaching solar panels to structures, particularly but not exclusively roof-tops, which facilitates easy installation by fewer personnel, as few as one, and can be accomplished with less design time and installation time, and which facilitates safe placement of multiple panels on a slanted structure without risk of panels sliding off the structure, and with increased safety to installation personnel.

SUMMARY OF THE INVENTION

An object of the invention is, therefore, to provide an assembly and method for mechanically affixing solar panels to structures, such as roofs.

With the above and other objects in view, a feature of the invention is the provision of an assembly for mounting solar panels on a surface of a structure, the assembly including a first frame member adapted to receive and retain a first end portion of a solar panel, and a first mounting foot adapted for affixing to the surface of the structure, wherein the first frame member and the first mounting foot are adapted for locking engagement with each other to mount the first end of the solar panel on the structure surface.

In accordance with a further feature of the invention, there is provided, in combination with the first frame member and first mounting foot, a second frame member adapted to receive and retain a second end portion of the solar panel, and a second mounting foot adapted for affixing to the structure surface, the second frame member and the second mounting foot being adapted for connection to each other to mount the second end of the solar panel on the structure surface.

In accordance with a still further feature of the invention, there is provided a method for mounting a solar panel on a structure, the method comprising the steps of providing a first frame member adapted to receive and retain a first end portion of the solar panel, attaching the first frame member to the first end of the solar panel, providing a first mounting foot adapted for affixing to a surface of the structure and for locking engagement with the first frame member, affixing the first mounting foot to the surface of the structure, and interlocking the first frame member and the first mounting foot, whereby to lock the solar panel to the structure surface.

In accordance with a still further feature of the invention, there is provided a method for mounting a solar panel on a structure, as set forth immediately above, and including the further steps of providing a second frame member adapted to receive and retain a second end portion of the solar panel, attaching the second frame member to the second end portion of the solar panel, providing a second mounting foot and affixing the second mounting foot to the structure, and interlocking the second frame member and the second mounting foot, to secure the solar panel at first and second ends thereof to the structure.

In accordance with a still further feature of the invention, there is provided a method as set forth immediately above, wherein the first frame member is provided with a capture opening formed in part by a base portion having a rounded configuration, and the first mounting foot is provided with a mounting flange forming in part a recess adapted to secure the first frame member base portion, and the method comprises the further step of introducing the first frame member base portion into the first mounting foot recess, and rotating the first frame member so as to rotate the base portion thereof in the recess of the first mounting foot until the first mounting foot flange is substantially wholly within the first frame member capture opening.

In accordance with a still further feature of the invention, there is provided a method as set forth immediately above wherein the first frame member is provided with a capture tooth member extending into an entrance of the capture opening, and the method includes the further step of rotating the first frame member base portion until the capture tooth bitingly engages the first mounting foot flange.

The above and other features of the invention, including various novel details of construction and combinations of parts and method steps, will now be more particularly described with reference to the accompanying drawings and pointed out in the claims. It will be understood that the particular devices and methods embodying the invention are shown by way of illustration only and not as limitations of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention, from which its novel features and advantages will be apparent.

In the drawings:

FIG. 3 is a perspective view of the first frame member of FIG. 2 shown with a first end of a solar panel disposed therein;

FIG. 4 is a side elevational view of a first mounting foot adapted for attachment to a building structure and adapted to interlock with the first frame member;

FIG. 5 is a perspective view of the first mounting foot of FIG. 4;

FIG. 8 is a side elevational view of the first frame member further engaged with the first mounting foot;

FIG. 9 is a side elevational view of the first frame member and the first mounting foot fully engaged with each other;

FIG. 14 is similar to FIG. 13, but is illustrative of an assembly including an alternative first mounting foot.

DESCRIPTION OF PREFERRED EMBODIMENTS

Figure 1:
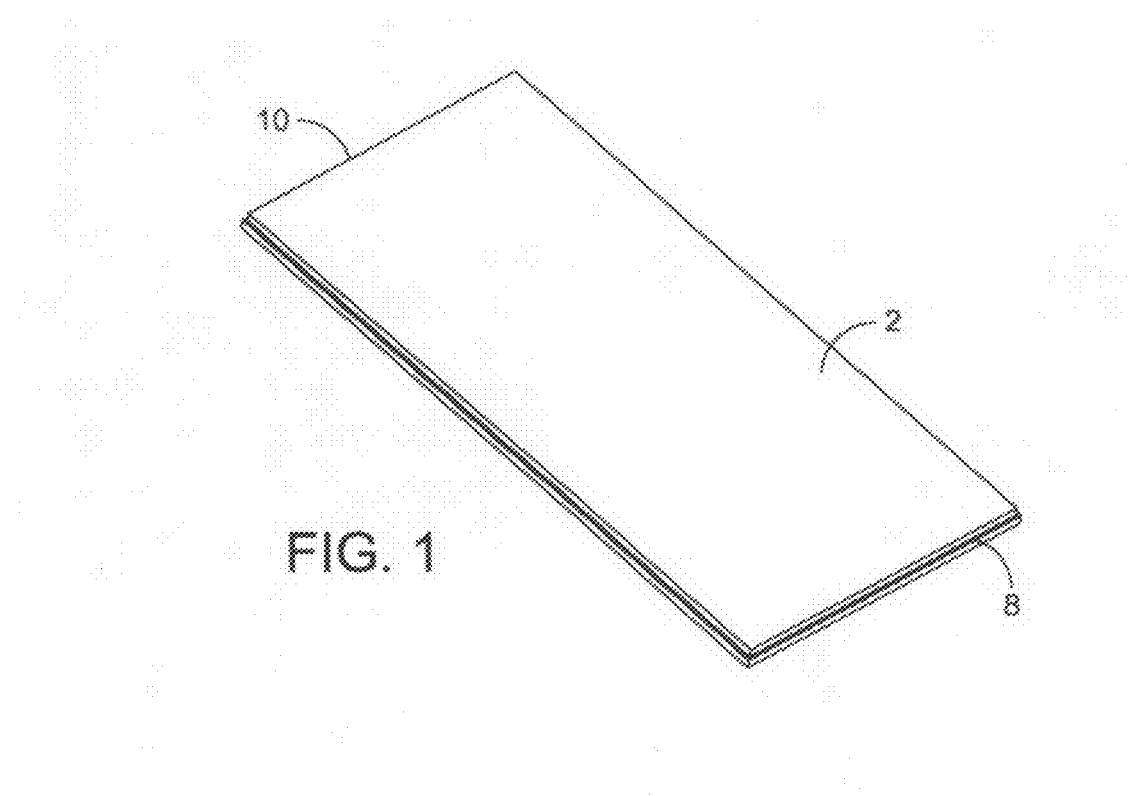
FIG. 1 is a perspective view of a solar panel of the type commonly mounted on building structures, particularly roofs.

The assembly described herein is adapted to retain a solar panel 2 of the type shown in FIG. 1 with opposite end edges 8, 10.

The assembly includes a first frame member 12 (FIG. 2) adapted to receive and retain the first end edge 8 of the solar panel 2, as shown in FIG. 3.

Figure 2:
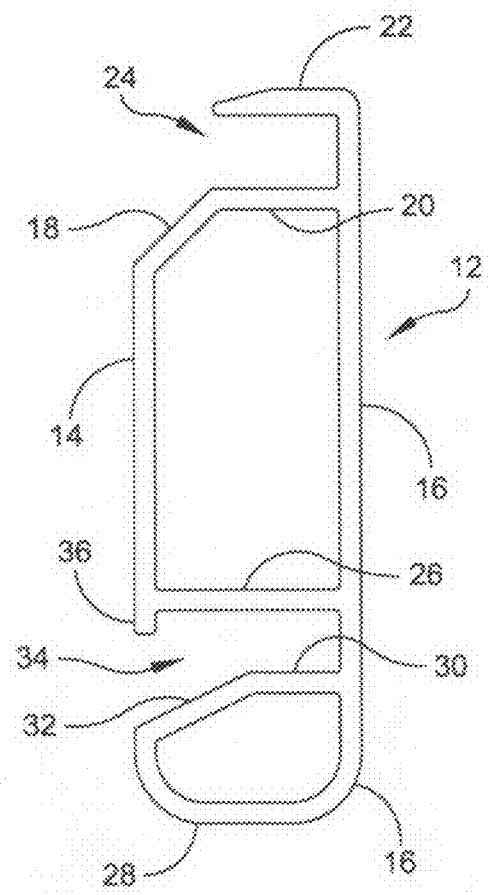
FIG. 2 is a side elevational view of a first frame member adapted for mounting on a building structure and adapted to receive and retain a first end of a solar panel.

The first frame member 12 is of a substantially rigid material, such as a rigid metal or plastic. Referring to FIGS. 2 and 3, it will be seen that the first frame member 12 includes first and second spaced walls 14, 16. The first wall 14 defines at a first end thereof a wall portion 18 angled from the wall 14 toward the wall 16, and a further wall 20 extending at an angle from the wall portion 18 and into juncture with the second wall 16.

An end portion 22 (FIGS. 2 and 3) of the wall 16 extends parallel to and adjacent to the wall 20 to form a pocket 24 adapted to receive and retain the end edge 8 of the solar panel 2, as illustrated in FIG. 3.

At an opposite end of the first frame member 12 the walls 14 and 16 are interconnected by a base wall 26. The wall 14 extends slightly beyond the base wall 26, as shown in FIGS. 2 and 3.

The second wall 16 extends beyond the base wall 26 and forms a curved portion 28. A ledge 30 extends from the wall 16 and parallel to and spaced from the base wall 26. The curved portion 28 of the wall 16 extends generally to the plane of the wall 14 and merges with a face 32 which is angled toward the base wall 26 and joins the ledge 30.

Thus, the base wall 26 and the ledge 30 form a capture opening 34. The face 32 slopes toward and into the capture opening 34, and the extension of the wall 14 beyond the base wall 26 forms a capture tooth 36 extending into the entrance to the capture opening 34.

The assembly further includes a first mounting foot 40 shown in FIGS. 4 and 5. The mounting foot 40 includes a base plate 42 for attachment to a surface S on which the assembly is to be mounted. A wall 44 upstands from an edge of the base plate 42, and from an upper edge 46 of the wall 44 there extends an angled planar surface 48 extending to a generally c-shaped structure 50, including a landing surface 52, a back panel 54 and a top portion 56 forming a pocket 59.

As shown in FIG. 3, an edge 8 of a solar panel 2 is inserted into the pocket 24 of the first frame member 12 and retained therein by a holding means (not shown), such as screws, adhesive, or the like.

Figure 6:
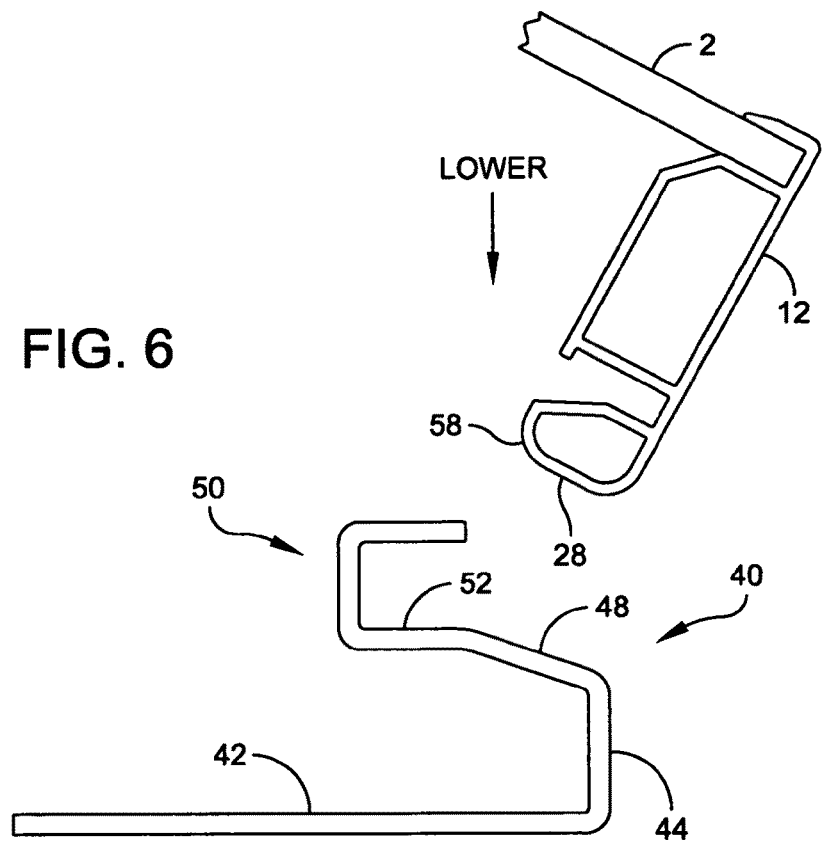
FIG. 6 is a side elevational view illustrating bringing together of the first frame member, with a solar panel disposed therein, and the first mounting foot.
Figure 7:
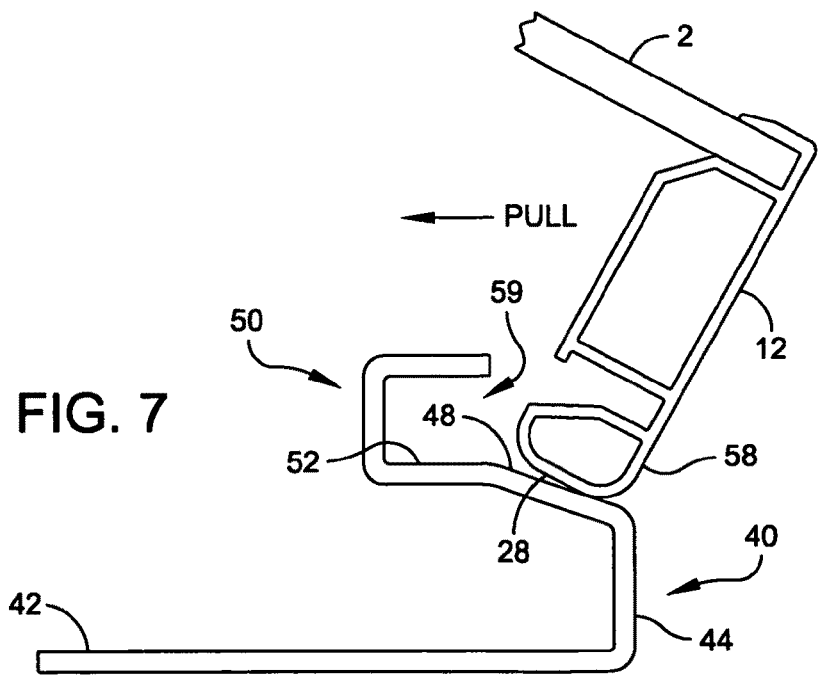
FIG. 7 is a side elevational view of the first frame member and the first mounting foot engaged with each other.

The solar panel 2 and first frame member 12 are lowered into engagement with the first mounting foot 40 (FIGS. 6 and 7). The curved portion 28 of the first frame member 12 is brought into engagement with the planar surface 48 of the first mounting foot 40. The solar panel 2 and the first frame member 12 fixed thereto are moved along the planar surface 48 and landing surface 52 of the first mounting foot 40 until a lower end 58 of the first frame assembly 12 is snugly engaged in the c-shaped structure 50 of the first mounting foot 40.

The face 32 of the first frame member 12 is configured to extend substantially parallel to the top portion 56 of the c-shaped structure 50, as shown in FIG. 8, to assist in guiding the lower end 58 of the first frame member 12 into the c-shaped structure 50 of the first mounting foot 40. FIGS. 6-9 illustrate the sequence of movements by which the first frame member 12 is fixed to the first mounting foot 40.

As the first frame member 12 is pivoted from the position shown in FIG. 8 to the position shown in FIG. 9, the capture tooth 36 bitingly engages the top portion 56 of the c-shaped structure 50 to lock the top portion 56 of the first mounting foot 40 in the capture opening 34 of the first frame member 12, thereby locking the lower end 58 of the first frame member 12 in the c-shaped structure 50 of the first mounting foot 40.

The first mounting foot 40 is attached to the surface S by screws 66 (FIG. 5), or the like, in preparation for receiving the solar panel 2, such that once the solar panel is anchored to the structure S by the interconnection of the first frame member 12 and the first mounting foot 40, the solar panel may be left unattended without fear of the solar panel sliding or being blown off the supporting structure.

The first frame member 12 and the solar panel 2 can be connected together at a site removed from the supporting structure S, and the mounting feet 40 can be anchored on a structural surface by a single worker. The first frame members 12 can be latched onto previously mounted first mounting feet 40 and thereby onto the surface S by a single worker as quickly as the solar panels and frame members are brought to the site. Thus, there is no need for stacking solar panels, or having workers hold them in place while they are fixed to the surface S at the site, and no need for teams of workers to risk lengthy roof-top installation.

To complete the mounting of the solar panels 2 to the structural surface S, there is provided a second frame member 60 (FIG. 10) adapted to be fixed to the other end 10 of the solar panel 2, the second frame member 60 having a pocket 62 therein similar to the pocket 24 of the first frame member 12. A second mounting foot 64, which may be an L-shaped bracket, is fixed to the supporting structure S, as by screws, or the like, and may be connected to the solar panel 2 by retaining the second end of the solar panel in the pocket 62 and securing the second frame member 60 to the second mounting foot 64 as by screws, or the like.

Figure 10:
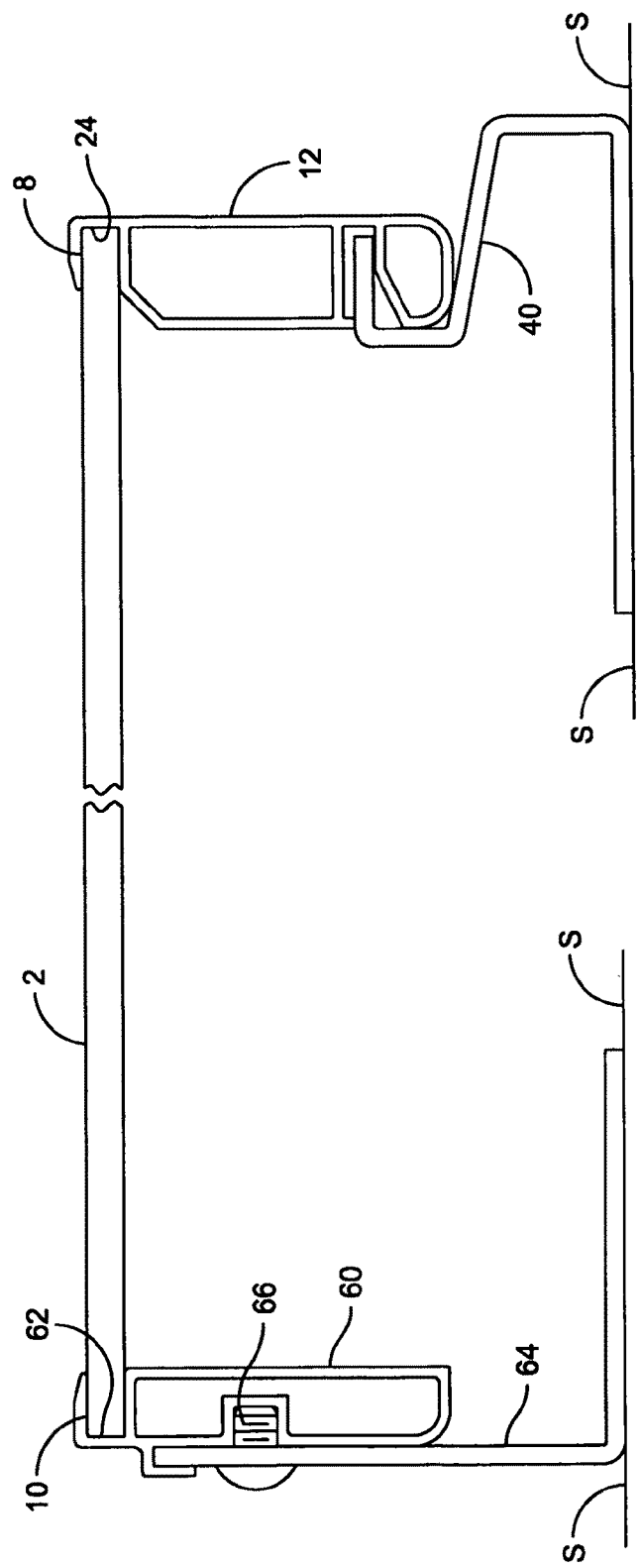
FIG. 10 is a side elevational view of the first frame member and first mounting foot of FIG. 9 in combination with a second frame member and a second mounting foot retaining a second end of the solar panel.
Figure 11:
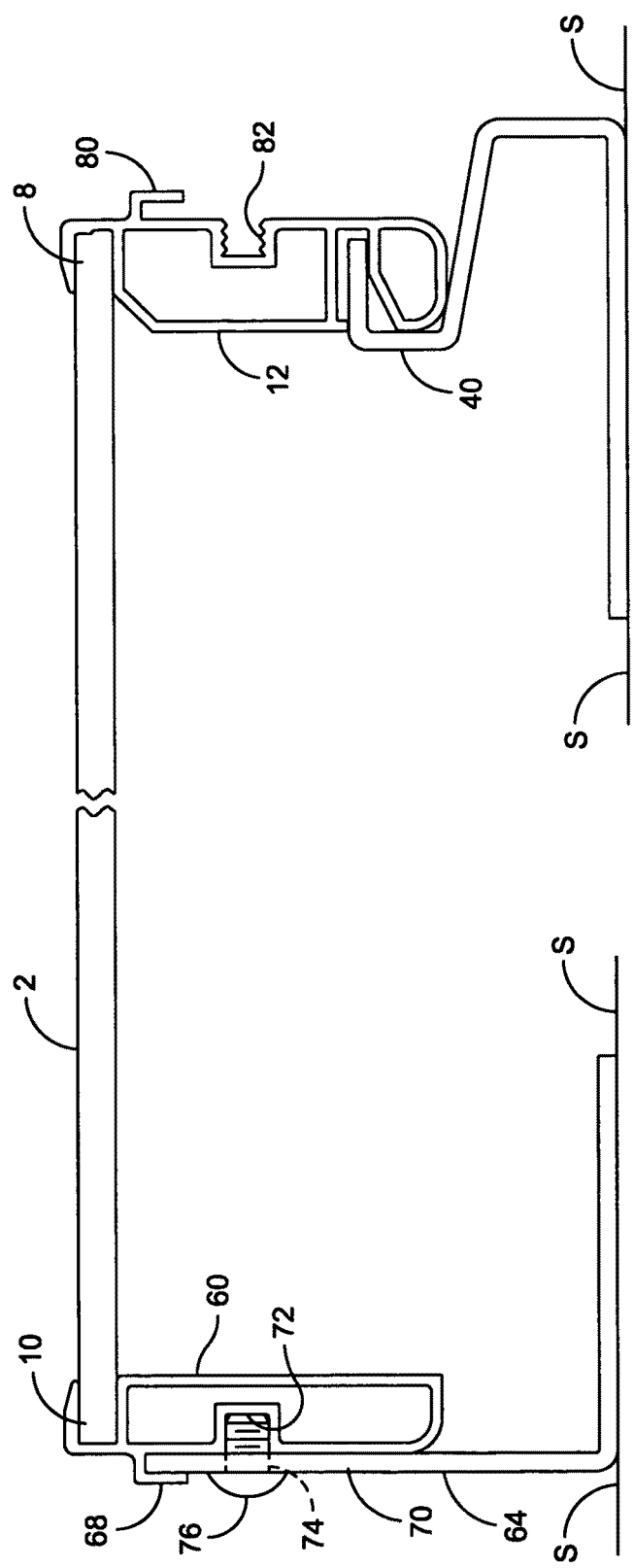
FIG. 11 is similar to FIG. 10, but is illustrative of a modified first frame member.

Accordingly, the usual dangers to personnel and equipment normally associated with the installation of roof-top solar panels are greatly reduced inasmuch as the mounting feet can be easily and quickly secured one after the other to a surface by very few personnel, and the solar panels can be immediately snapped into the first frame assemblies which secure the panels against wind and sliding off a slanted roof, and subsequently the second frame member 60 can be secured with one or two bolts or screws 66 (FIGS. 10 and 11). The second frame member 60 may be provided with a flange 68 for receiving a leg 70 of the second mounting foot 64 to capture the second frame member 60 to the second mounting foot 64. To secure the second frame member 60 to the second mounting foot 64, the second frame member 60 is provided with an internally threaded channel 72 aligned with an orifice 74 for receiving a screw or threaded bolt 76.

Figure 12:
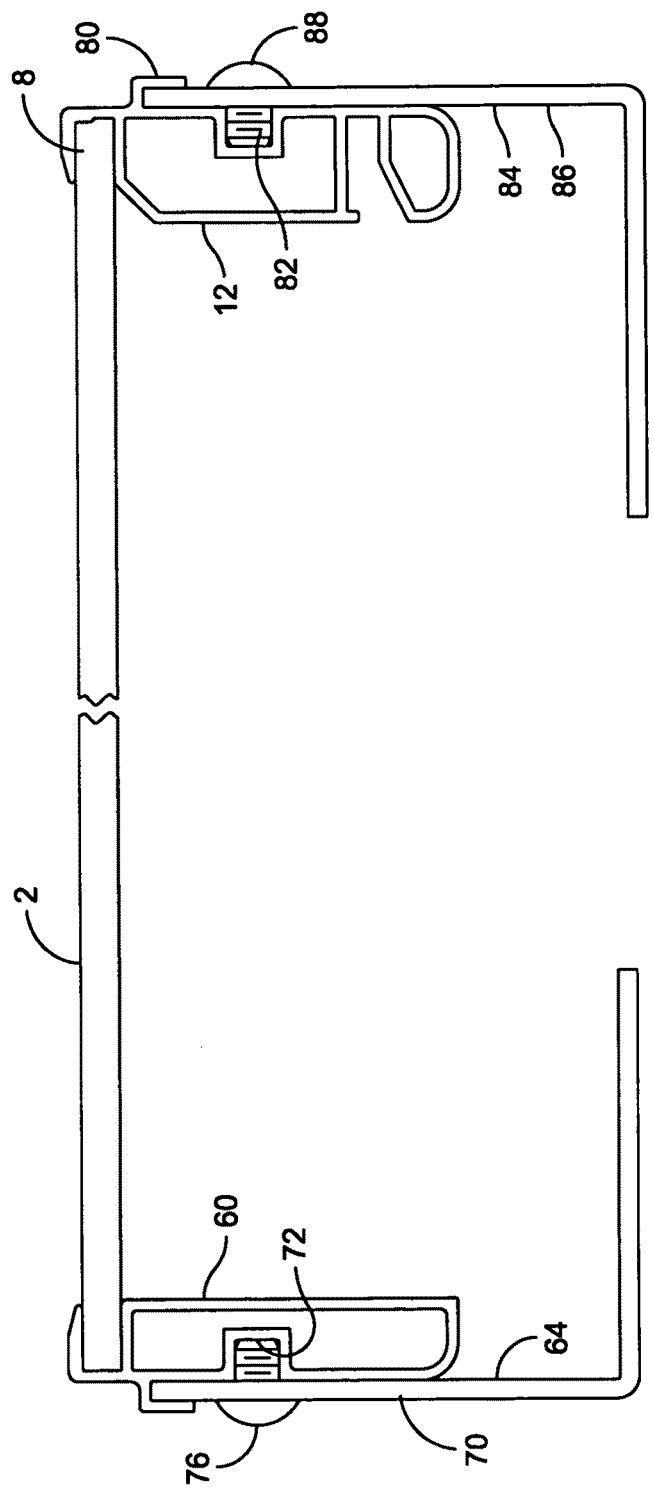
FIG. 12 is similar to FIG. 11, but is illustrative of an assembly including substantially similar first and second mounting feet.

Similarly, and still referring to FIG. 11, the first frame member 12 may be provided with a flange 80 and a threaded channel 82. A first frame member 12 so constructed can be used as previously described in conjunction with a first mounting foot 40, as shown in FIG. 11, or may, alternatively, be used in conjunction with a mounting foot 84, as shown in FIG. 12, similar to the mounting foot 64. In this case, the frame member 12 is provided with the flange 80 which received a portion 86 of the mounting foot 84, and is provided with the threaded channel 82 for receiving a bolt or screw 88.

Figure 13:
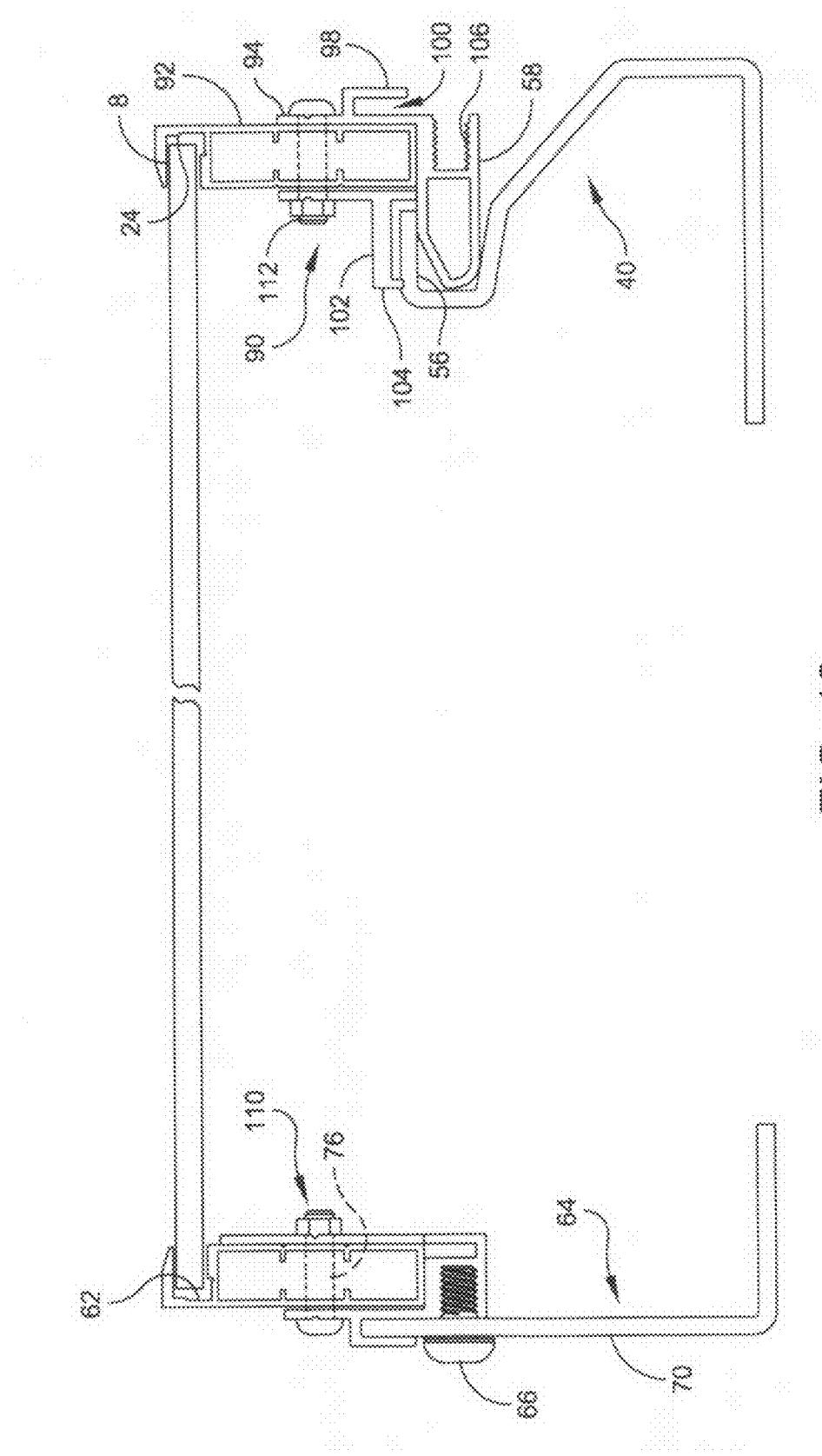
FIG. 13 is similar to FIG. 12, but is illustrative of an assembly including an alternative embodiment of first frame member.

In alternative embodiments, shown in FIGS. 13 and 14, the frame members 90 and 110 are each two-piece members. Frame member 90 includes a body portion 92 which receives and retains the end 8 of the solar panel 2. The frame member 90 further includes a portion 94 which slideably receives the body portion 92 on which there is mounted a flange 98 forming a recess 100, a ledge 102 having a tooth 104 extending from a free edge thereof, and a base portion, 58 similar to the base portion 58 shown in FIGS. 3 and 6-9. In this embodiment, however, the base portion 58 is provided with a threaded channel 106 for receiving a bolt or screw 108, shown in FIG. 14. The outer body portion 94 and inner body portion 92 are locked to each other by a screw or bolt and nut 112.

The alternative first frame member 90 may be used in conjunction with a first mounting foot 40, as shown in FIG. 13, or in conjunction with the mounting foot 86, as shown in FIGS. 12 and 14.

When used with the first mounting foot 40 (FIG. 13), the frame assembly 90 and the mounting foot 40 are joined together, as shown in FIGS. 6-9. In this instance, the tooth 104 bites into the top portion 56 of the first mounting foot 40.

When used with the mounting foot 86, an end of the wall 128 of the mounting foot 86 is received by the recess 100 formed by the flange 98 on the body portion 94 of the frame member 90.

As shown in FIGS. 13 and 14, the second mounting member 110 may also be of two-part construction, having an inner member 120 slidably received by an outer member 122. The two members 120, 122 may be connected together by a screw or bolt and nut 124. The outer member 122 is provided with a flange 126 configured to receive a wall portion 128 of a mounting foot 86. The outer member 122 is provided with a threaded channel 130 for receiving a screw or bolt 132 extending through the mounting foot wall portion 128.

There are thus provided means by which a solar panel may be quickly affixed to a roof top or other structure in short order by one or more workers at the installation site.

It will be understood that many additional changes in the details, materials, steps and arrangements of parts, which have been herein described and illustrated in order to explain the nature of the invention, may be made by those skilled in the art within the principles and scope of the invention as expressed in the appended claims.

What is claimed is:

1. An assembly for mounting a solar panel to a structural surface, the assembly comprising:
   a first frame member adapted to receive and retain a first end portion of a solar panel; and
   a first mounting foot adapted for attachment to the structural surface and comprising a base portion adapted for attachment to the structural surface, and a flange fixed to said base portion and spaced from said base portion, and having a free edge;
   wherein said first frame member is provided with a pocket for the receiving and retaining of the first end portion of the solar panel, and with a capture opening defined by first and second walls spaced apart to receive and retain therebetween said flange of said first mounting foot;
   wherein said second wall is in part sloped so as to receive said flange of said first mounting foot and guide said flange into said capture opening;
   wherein said first frame member is provided with a capture tooth adapted to bitingly engage said flange of said first mounting foot when said flange is disposed substantially fully in said first frame member capture opening;
   wherein said first frame member and said first mounting foot are adapted to rotatably interlock with each other to mount the first end portion of the solar panel on the structural surface.

2. The assembly in accordance with claim 1 and further comprising:
   a second frame member adapted to receive and retain a second end portion of the solar panel; and
   a second mounting foot adapted for attachment to the structural surface;
   wherein said second frame member and said second mounting foot are adapted for connection to each other to mount the second end portion of the solar panel on the structural surface.

3. The assembly in accordance with claim 1 wherein said first mounting foot comprises:
   a protrusion extending from said base portion, said protrusion comprising:
   a first leg extending outwardly from said base portion at an angle transverse to said base portion;
   a second leg extending from said first leg and angled relative to said first leg and to said base portion;
   a flange support portion extending from said second leg; and
   said flange extending from said flange support portion and generally parallel to said base portion;
   said second leg, flange support portion and flange forming a pocket for receiving a retaining a portion of said first frame member.

4. The assembly in accordance with claim 2 wherein said second mounting foot comprises a second base portion adapted for attachment to the structural surface and a support portion extending from said second base portion, and said second frame member is provided with a second pocket for securing and retaining the second end portion of the solar panel.

5. The assembly in accordance with claim 2 wherein said second frame member is provided with a flange extending therefrom and forming a recess for receiving a wall portion of said second mounting foot.

6. The assembly in accordance with claim 5 wherein said second frame member is provided with a threaded channel for receiving a threaded fastener extending through a wall of said second mounting foot.

7. The assembly in accordance with claim 2 wherein said second frame member comprises:
   an inner body portion having a pocket at a first end thereof for receiving and retaining the second end portion of the solar panel; and
   an outer body portion disposed around said inner body portion and adapted to be locked to said inner body portion.

8. The assembly in accordance with claim 7, wherein:
   said outer body portion is provided with a flange defining a recess adapted to receive a wall portion of said second mounting foot; and
   said outer body portion is provided with a threaded recess for receiving a fastener extending through said second mounting foot for locking said inner and outer body portions to each other.

9. An assembly for mounting a solar panel to a structural surface, the assembly comprising:
   a first frame member adapted to receive and retain a first end portion of a solar panel; and
   a first mounting foot adapted for attachment to the structural surface;
   wherein said first frame member and said first mounting foot are adapted to rotatably interlock with each other to mount the first end portion of the solar panel on the structural surface;
   wherein said first mounting foot comprises:
      a base portion for attachment to the structural surface;
      a protrusion extending from said base portion, said protrusion comprising:
      a first leg extending outwardly from said base portion at an angle transverse to said base portion;
      a second leg extending from said first leg and angled relative to said first leg and to said base portion;
      a flange support portion extending from said second leg; and
      a flange extending from said flange support portion and generally parallel to said base portion;
      said second leg, flange support portion and flange forming a pocket for receiving and retaining a portion of said first frame member;
   an outer wall portion of said first frame member having a curved end portion joining a sloped wall of a capture opening, wherein said pocket is adapted to receive said first frame member wall curved end portion, and said first frame member wall curved end portion is adapted to be moved into said first mounting foot pocket and rotated therein until said flange is substantially fully disposed in said capture opening;
   an inner wall portion of the first frame member extending generally parallel to said outer wall portion and spaced therefrom, said inner wall portion having a sloped surface extending to a first frame member pocket for receiving the solar panel first end portion, said sloped surface being configured to guide the solar panel first end portion into said first frame member pocket;
   wherein an end of said inner wall portion extends into said capture opening and forms a tooth projecting into said capture opening and engageable with said first mounting foot flange to lock said flange in said capture opening.

10. The assembly in accordance with claim 9 and further comprising:
    a second frame member adapted to receive and retain a second end portion of the solar panel; and
    a second mounting foot adapted for attachment to the structural surface;
    wherein said second frame member and said second mounting foot are adapted for connection to each other to mount the second end portion of the solar panel on the structural surface.

11. The assembly in accordance with claim 10 wherein said second mounting foot comprises a second base portion adapted for attachment to the structural surface and a support portion extending from said second base portion, and said second frame member is provided with a second pocket for securing and retaining the second end potion of the solar panel.

12. The assembly in accordance with claim 10 wherein said second frame member is provided with a flange extending therefrom and forming a recess for receiving a wall portion of said second mounting foot.

13. The assembly in accordance with claim 12 wherein said second frame member is provided with a threaded channel for receiving a threaded fastener extending through a wall of said second mounting foot.

* * * * *